Dec. 22, 1931.  C. E. WENRICH  1,837,741
TRIMMING ATTACHMENT FOR LAWN MOWERS
Filed Oct. 20, 1930
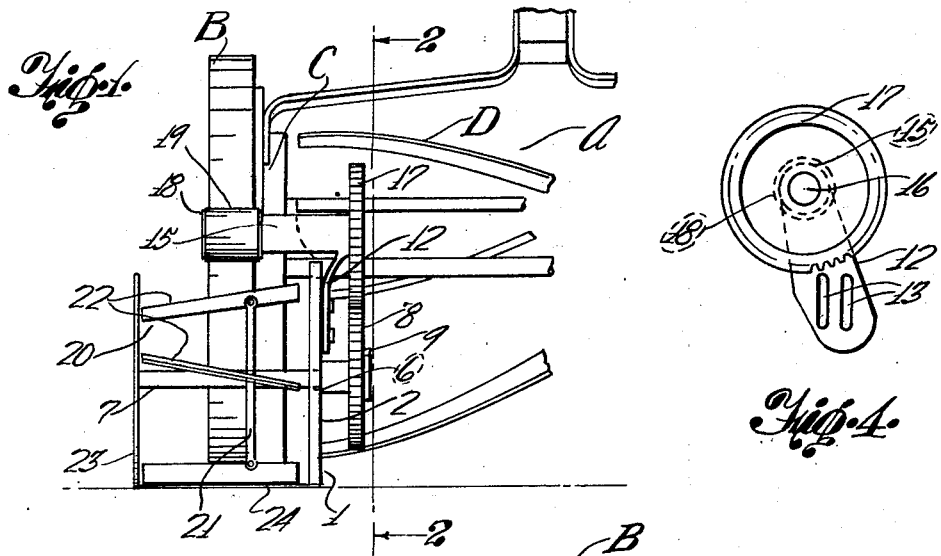
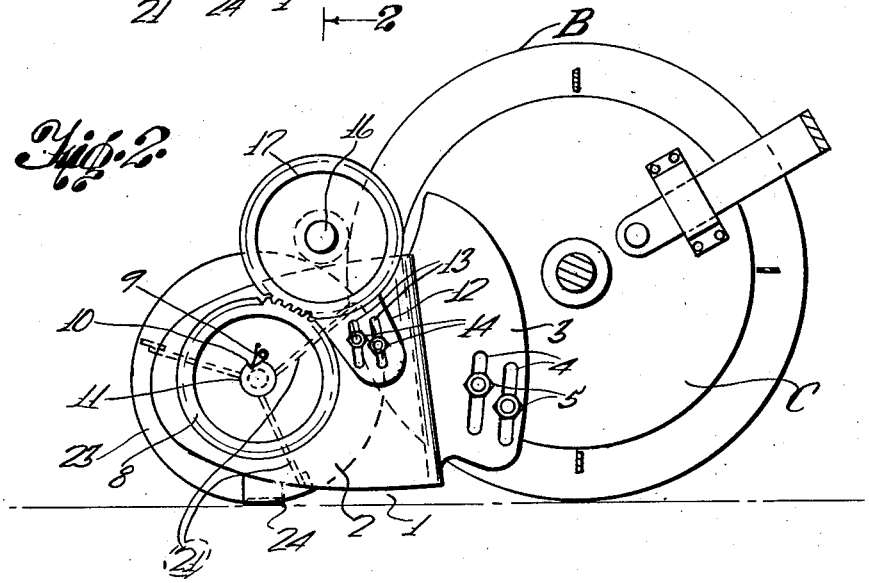
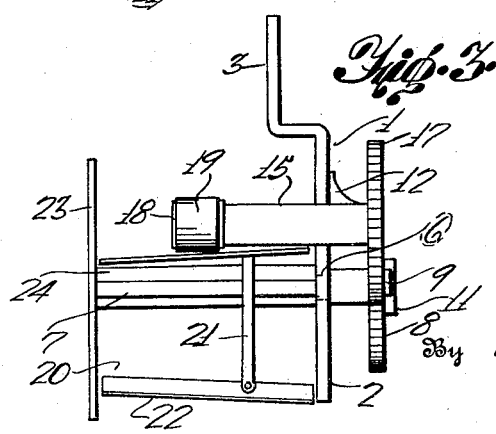
Inventor
Christ E. Wenrich
By Adam E. Fisher
Attorney Patented Dec. 22, 1931

1,837,741

UNITED STATES PATENT OFFICE

CHRIST E. WENRICH, OF HARRISBURG, PENNSYLVANIA

TRIMMING ATTACHMENT FOR LAWN MOWERS

Application filed October 20, 1930. Serial No. 489,816.

My invention is a trimming attachment for lawn mowers and the main object is to provide a simple, durable and efficient device which may be attached to the mower whereby the same may be used to cut or trim close up to walls, trees, walks or other places ordinarily inaccessible to the mower.

Another object is to provide a trimming device of the above character which may be readily and conveniently mounted on or detached from a lawn mower of practically any type or size.

The foregoing and other objects together with means whereby the same may be carried into effect will best be understood from the following description of a preferred embodiment of the invention taken in connection with the accompanying drawings wherein:

Figure 1 is a fragmental front view of a lawn mower equipped with my lawn trimmer.

Figure 2 is an enlarged section along the line 2—2 in Figure 1.

Figure 3 is a plan view of my lawn trimmer alone.

Figure 4 is a detail side view of the drive gear and its supporting bracket.

Referring now more particularly to the drawings the reference character A designates a mower of conventional type including the drive wheel B, side frame or gear casing C and cutting reel D. No invention is claimed for the foregoing elements and they serve merely as a means to illustrate the application of my invention.

In carrying out my invention I provide a mounting plate 1 comprising a forward portion 2 and a laterally offset attaching portion or tang 3. The tang 3 has elongated slots 4 through which mounting bolts 5 may be passed and threaded into the side frame C, the plate 1 being thus secured to the mower A with its forward portion 2 extended forwardly from the mower in a line parallel with the line of travel thereof and slightly inside of the plane or line of travel of the wheel B. An aperture or journal 6 is provided in the forward portion 2 of the plate 1 and a reel axle 7 is journaled therethrough in a horizontal plane and forwardly of the wheel B. A gear 8 is journaled on the inner end of the axle 7 at the inner side of the plate 1 and this gear carries a spring set pawl 9 normally engaging a notch 10 in the enlarged inner end 11 of the axle 7 whereby the gear when rotated in one direction will turn the axle 7 but will move freely on the axle when rotated in the opposite direction. A bracket 12 is provided and the same has slots 13 near one end through which mounting bolts 14 may be passed and threaded into the forward portion 2 of the plate 1 to adjustably secure the said bracket to the said plate. At its other or upper end the bracket 12 carries an elongated bearing or journal 15 through which is journaled the drive shaft 16. A drive gear 17 is fixed to the inner end of the drive shaft 16 and meshes with the aforesaid gear 8 on the reel axle 7. A friction drive wheel or roller 18 is secured to the outer end of the drive shaft 16 and preferably, though not necessarily has a resilient covering or face as designated at 19. The bracket 12 is adjusted on the plate 1 so that the roller 18 bears against the periphery of the drive wheel B of the mover, the said roller being then rotated by the drive wheel as the mower is pushed over the lawn. This action of course rotates the reel axle 7 through the gears 8 and 17, the pawl 9 being so arranged that the reel axle is rotated only when the mower is traveling forwardly as will be understood.

A cutting reel designated generally by 20 is secured to and rotates with the reel axle 7 and the said reel comprises a spider 21 secured to the reel axle and a plurality of blades 22 secured to the spider in the usual manner. A side wheel or disk 23 is secured to the extreme outer end of the reel axle 7 and turns therewith and a bed knife 24 is secured to the lower edge of the forward portion 2 of the plate 1 and extends outwardly therefrom beneath the reel 20.

In operation the device is mounted on the mower in the manner set forth and the mower is then pushed along the wall or walk with the wheel or disk 23 in contact therewith. The reel 20 is thus rotated and the grass is cut by the reel and the bed knife 24 in the usual manner. The wheel or disk 23 tends to move or bend the grass outward from the wall or walk into the path of the reel 20 thus cutting the grass close against the same. The arrangement of the attaching plate 3 and bracket 12 is such that the device may be adapted for use upon mowers of practically any size or type.

While I have herein set forth a certain preferred embodiment of my invention it is understood that I may vary from the same in minor structural details, not departing from the spirit of the invention and within the scope of the appended claim.

I claim:

In a device of the kind described, in combination with a mower including a drive wheel and side frame, a mounting plate adjustably secured to the mower side frame and extended forwardly therefrom, an axle journaled in the mounting plate, grass cutting means mounted on the axle, a gear on the end of the axle, a bracket adjustably mounted on the mounting plate, a drive shaft journaled in the bracket, a gear on one end of the drive shaft and meshed with the said gear on the axle, and a drive roller secured on the drive shaft and frictionally engaging the drive wheel of the mower.

In testimony whereof I affix my signature.

CHRIST E. WENRICH.